Patented Nov. 2, 1937

2,098,094

UNITED STATES PATENT OFFICE 2,098,094

WATER-SOLUBLE ORGANIC IODINE COMPOUNDS

William Hiemenz and Louis Freedman, Albany, N. Y., assignors to Winthrop Chemical Company, Inc., New York, N. Y., a corporation of New York No Drawing. Application May 29, 1936, Serial No. 82,527

3 Claims. (Cl. 260—108)

This invention relates to water-soluble iodophenoxy aliphatic acid-sulfonic acid compounds of the general formula:

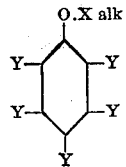

wherein X represents an aliphatic radical of the group consisting of $$-CH_2-COO-, \quad -CH_2-CH_2-COO-, \quad -\underset{\underset{}{|}}{\overset{CH_3}{CH}}-COO-,$$

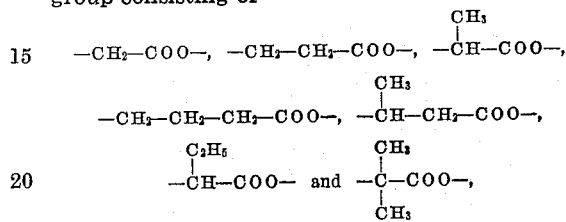

one Y represents —SO₃ alk, at least one Y represents I, and the remaining Y's represent a member of the group consisting of —H and —I, and alk represents a basic radical capable of producing water-soluble salts, such as sodium, potassium, lithium, ammonium, diethyl amine, and diethanol amine.

Though not limited thereto, the invention particularly contemplates the production of 2,6-di-iodo-phenoxy aliphatic acid-4-sulfonic acid compounds of the general formula:

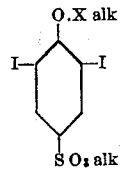

in which X and alk have the same meaning as above.

It is one of the objects of this invention to prepare water-soluble derivatives of 2,6-di-iodo phenol sulfonic acid, which derivatives will be suitable for use as radio opaque media in urography.

The process for the production of these compounds can best be illustrated by the following example which is given merely as illustrative of the process and is not considered as being in any way limiting upon the invention defined in the claims. All parts are by weight.

*Example.*—A solution of 18 parts of 2,6-di-iodophenol 4-sodium sulfonate in 40 parts of normal sodium hydroxide solution is mixed with a solution of sodium chlor acetate prepared by neutralizing 4.5 parts of monochlor acetic acid in 12 parts of water with the required amount of sodium carbonate. The mixture is heated on a water bath at 70° C. for 3 to 4 hours and is stirred frequently. The solution is filtered while still warm and gives, on cooling in ice, a crystalline precipitate. The resultant product represents the di-sodium salt, having the formula:

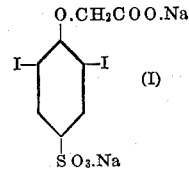

It is purified by dissolving in water, from which the purified product is recovered by adding dilute hydrochloric acid, which precipitates the free carboxylic acid compound, having the formula:

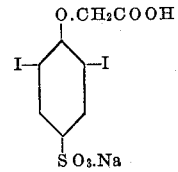

This substance is, then, reconverted to the disodium salt by dissolving it in the calculated amount of sodium hydroxide solution and finally precipitating this di-sodium salt from an alcoholether mixture. The product appears in the form of a fine crystalline precipitate, which is filtered, washed with alcohol, and dried. It has the formula (I) given above and, on analysis, shows a content of 48.5% iodine and 9.0% sodium. It is very soluble in water and can easily be made up to a 50% solution. It is difficultly soluble in organic solvents. The aqueous solution of the salt gives no immediate precipitate on addition of silver nitrate test solution but, upon standing, a crystalline precipitate of the silver salt forms.

While we have specifically described the preparation of the di-sodium salt, we do not wish to limit the scope of the invention to this particular salt. Obviously, the sodium radical of both the acetic and sulfuric acid groups may be replaced by potassium or other alkaline radicals, such as lithium or ammonium or alkyl derivatives of the latter, such as diethyl amine or diethanol amine. Likewise, mixed salts may be prepared, such as 2,6-di-iodo-4-potassium sulfo-phenoxy sodium acetate, prepared from the 2,6-di-iodo-4-potassium sulfo-phenol.

Having now particularly described our invention, what we claim is:

1. Water-soluble salts of iodo-phenoxy aliphatic sulfonic acid compounds of the general formula:

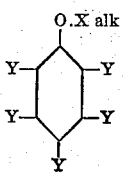

in which X represents a member of the group consisting of $CH_2COO-$, $(CH_2)_2COO-$ and $(CH_2)_3COO-$, one Y represents $-SO_3$ alk, at least one Y represents I, and the remaining Y's represent a member of the group consisting of $-H$ and $-I$, and alk represents a basic radical capable of producing water-soluble salts.

2. Water-soluble salts of 2,6-di-iodo-phenoxy aliphatic sulfonic acid compounds of the general formula:

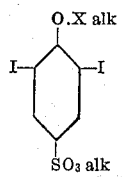

in which X represents an aliphatic radical selected from the group consisting of $CH_2COO-$, $(CH_2)_2COO-$, and $(CH_2)_3COO-$, and alk represents a basic radical capable of producing water-soluble salts.

3. The disodium salt of 2,6-di-iodo-4-sulfophenoxy acetic acid, having the structural formula:

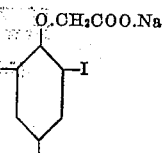

being a white, crystalline, water-soluble salt.

WILLIAM HIEMENZ.
LOUIS FREEDMAN.